United States Patent [19]

Chown

[11] Patent Number: 4,647,762
[45] Date of Patent: Mar. 3, 1987

[54] OPTICAL RECEIVER

[75] Inventor: David P. M. Chown, Great Dunmow, Great Britain

[73] Assignee: International Standard Electric Corporation, New York, N.Y.

[21] Appl. No.: 782,239

[22] Filed: Sep. 30, 1985

[30] Foreign Application Priority Data

Sep. 29, 1984 [GB] United Kingdom ................ 8424644

[51] Int. Cl.$^4$ ........................ H01J 40/14; H03F 17/00
[52] U.S. Cl. .................................... 250/214 A; 330/59
[58] Field of Search .................... 250/214 A; 330/59; 455/606, 617, 619

[56] References Cited

U.S. PATENT DOCUMENTS 3,801,933  4/1974  Teare .............................. 250/214 A

FOREIGN PATENT DOCUMENTS 1582726  1/1981  United Kingdom ................ 455/619

Primary Examiner—Gene Wan
Attorney, Agent, or Firm—John T. O'Halloran; Robert P. Seitter

[57] ABSTRACT

An optical receiver of the so-called high impedance type has a photo-diode onto which the modulated light beam from an optical fiber, or received via free space, falls to produce a current in that diode. One end of the diode is coupled directly to the gate of a FET, the other end of the diode being coupled via a capacitor to the source of the FET. The FET's source and its bias resistor are on a source-connected pad. The source output of the FET is coupled via an emitter follower impedance buffer and an equalizing capacitor to a broad-band amplifier. Thus the receiver has a flat overall in-band response.

4 Claims, 2 Drawing Figures

OPTICAL RECEIVER

BACKGROUND OF THE INVENTION

1. Field of the Invention

This invention relates to an optical receiver such as may be used to terminate an optical fiber transmission line, or respond to an optical beam in free space.

2. Description of the Prior Art

Conventional high-speed optical receiver design is based on the well-known "high impedance" or "integrating" approach, an example of which is shown in FIG. 1. Here the light beam from an optical fiber, or received via free space, falls on a PIN diode 1 connected to the gate of an FET 2 having a drain resistor 6 and whose output, taken from the source, is coupled via an equalizing capacitor 3 to a broadband amplifier 4. The output of this amplifier 4 goes to the detection circuitry of the receiver. To achieve minimum noise, the load resistor 5 ($R_L$) in series with the diode 1 is large in value, so the frequency response of the front end rolls off at $-6$ dB/octave through the frequency band of operation, and the signal at the input node (i.e. the gate of FET 2) takes a heavily integrated form. In such an arrangement a voltage swing of about 50 mV is allowable for an integrated waveform.

Such a receiver has to be operated with a digital optical line code of bounded digital sum variation (DSV), i.e. a code in which the cumulative disparity between the total number of received ones and zeroes is limited to a given small number, e.g. 4. Hence although the average phot-current may cause a high standing voltage drop across $R_L$ when the received optical power is large, the signal swing at the amplifier input node remains a small fraction of this drop and can thus readily be handled by the following amplifier before effecting equalization via a C-R differentiator. This gives good sensitivity, due to the large value of load resistor 5, and a reasonable dynamic range, but is only operable with a bounded DSV line code. However, at higher speeds, codecs for bounded DSV codes are relatively complex, so it is desirable if possible to operate systems with unbounded DSV codes. The high impedance receiver then suffers a severe "trade-off" between needing a large load resistor for sensitivity, but a low load resistor to limit the swing to a manageable level to achieve a workable dynamic range, so overall performance is poor.

An alternative conventional approach to the high-impedance receiver is the transimpedance configuration, in which the load resistor is in the feedback path of the receiver amplifier. This is normally so designed so as to achieve a flat overall frequency response across the required band of operation, and owing to practical component limitations this invariably results in the use of a lower value of load resistor than would be possible for an integrating receiver, and hence a significant sensitivity penalty. In addition, parasitics and component limitations make the transimpedance receiver, with its feedback around three active devices, increasingly difficult to realize where bandwidths of greater than a few hundreds of megahertz are required.

SUMMARY OF THE INVENTION

An object of the invention is to provide an optical receiver in which the disadvantages of the known receivers are minimized or overcome.

According to the invention there is provided an optical receiver for the reception of a modulated light beam from an optical fiber or via free space, which includes a photo-diode on to which the light beam falls, so that an electrical current is produced therein whose value depends on the beam, wherein one terminal of the photo-diode is connected to the gate of a field effect transistor (FET) and the other terminal of the photodiode is capacitively coupled to one of the other terminals of the FET.

In the preferred arrangement of the invention the capacitive coupling is to the source of the FET.

DETAILED DESCRIPTION OF THE INVENTION

Figure 1:
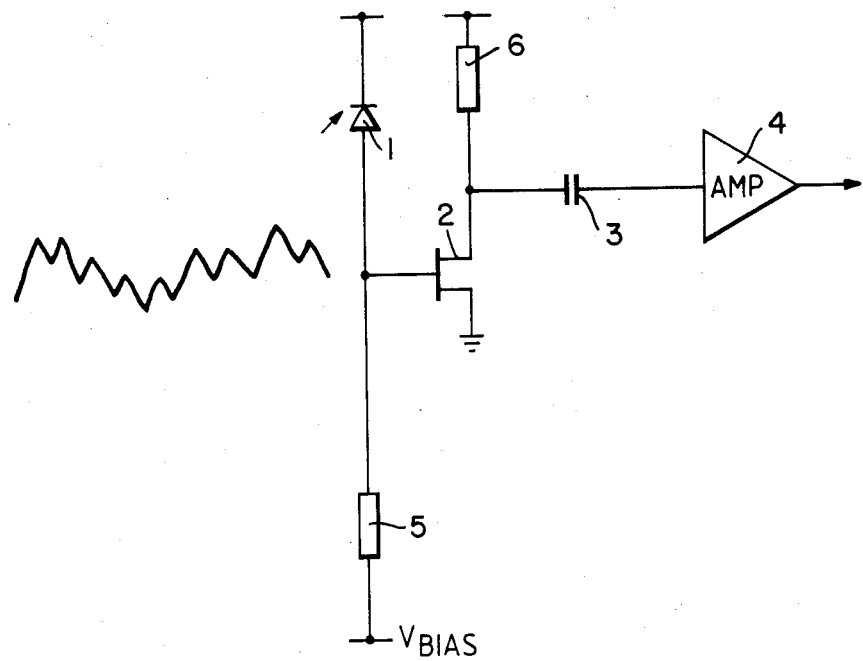
FIG. 1 as described above shows a circuit for a prior art optical receiver.
Figure 2:
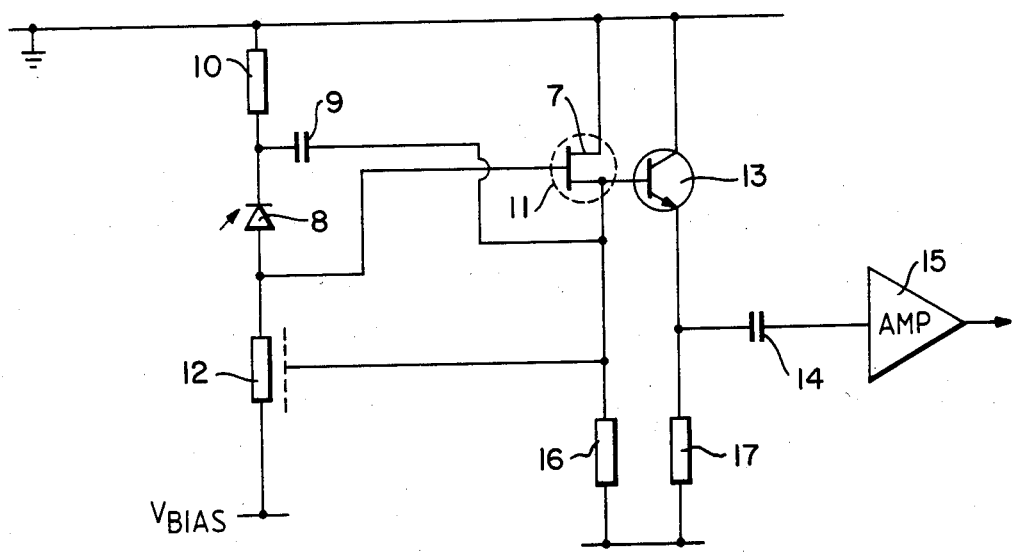
FIG. 2 discloses a circuit embodiment of the optical receiver of the present invention.

The arrangement shown in FIG. 2 can be referred to as the bootstrapped-PIN integrating source follower, or BPISF configuration. It offers a degree of sensitivity comparable with that of the conventional integrating receiver, while achieving good dynamic range with unbounded DSV line code. To combine good dynamic range with the sensitivity advantages of an integrating "high impedance" optical receiver, the BPISF avoids the use of voltage gain prior to equalization of the integrating front end response. Thus an increase in dynamic range by some 10-20 dB (optical) is provided.

Because no gain is included prior to equalization, the source follower receiver may be subject to sensitivity degradation owing to following amplifier noise. To minimize this it is important to maximize the "in-band-gain" of the front end, which following equalization is given approximately in the expression $$1/(2\pi B_{eq} \cdot C_{in})$$

wherein $B_{eg}$ = overall equalized—3 dB bandwidth and $C_{in}$ = effective shunt capacitance at the input node. Hence the need is to minimize $C_{in}$, which is composed of:

FET drain to gate capacitance, FET gate to substrate capacitance, resistor plus stray capacitance and PIN photodiode capacitance.

Of these the first is minimized by appropriate choice of FET 7, which is preferably a gallium arsenide device, and can be made very small (e.g. 0.1 pF) compared with the other three. However, the effect of the other capacitances can be substantially reduced.

The bootstrapping technique is used to minimize $C_{in}$ by capacitively coupling to the source of FET 7 as much as possible of the capacitance at the input node which would have appeared as capacitance to ground. Since the FET source follows the gate the effect of the "bootstrapped" capacitances to ground is virtually negated.

As shown in FIG. 2 photodiode 8 is connected to bias resistor 10 and its bias end is coupled via a large capacitance 9 to the FET 7 source, whilst the FET substrate and bias resistor 16 are placed on a source-connected conductive pad 11 so that their shunt capacitance is presented to the FET source rather than to ground. Note also the capacitive connection from the source of FET 7 to load resistor 12.

As a result the BPISF receiver configuration offers wide bandwidth, and wide dynamic range even with an unbounded DSV line code, and suffers only a very small sensitivity penalty compared with the conventional integrating PIN-FET approach which is satisfactorily only for use with bounded codes.

Thus in the circuit of FIG. 2, the photodiode D is coupled directly to the gate of the FET, and capacitively via capacitor 9 to the source thereof. The source of the FET is coupled via an emitter follower impedance buffer transistor 13 to the equalization capacitor 14. This buffer transistor 13 is shown as a bipolar emitter follower connected to bias resistor 17, but it could also be an FET connected as a source follower.

As a result of the connection of the output of transistor 13 via capacitor 14 to the broad-band output amplifier, a flat overall in-band response is obtained.

While I have described above the principles of my invention in connection with specific apparatus, it is to be clearly understood that this description is made only by way of example and not as a limitation to the scope of my invention as set forth in the objects thereof and in the accompanying claims.

I claim:

1. In an optical receiver of the type adapted to receive a modulated light beam, said receiver including a photo-diode adapted to receive said modulated light beam to provide an electrical current therein whose value depends on the intensity of the beam, a field effect transistor (FET) having a gate electrode directly connected to one terminal of the photo-diode, a capacitor connected between the other terminal of the photodiode and the source electrode of said FET, a bias resistor for the FET connected in series between the source electrode of the FET and a point of reference potential, the improvement in combination therewith of apparatus for minimizing the input capacitance to said receiver by capacitively coupling as much capacitance to the source electrode of said FET, comprising:

a conductive pad connected to said source electrode and having placed thereon the substrate component of said FET and said bias resistor component whereby the shunt capacitance of said components is presented to said FET source rather than to said point of reference potential.

2. The receiver combination according to claim 1, further including a bias resistor connected between one terminal of said photo-diode and a source of biasing potential, and a capacitive connection coupling said source electrode of said FET to said bias resistor.

3. The receiver combination according to claim 2, further including an amplifier transistor having a base, collector and emitter electrode, with said collector electrode connected to the drain electrode of said FET, with said base electrode connected to the source electrode of said FET and with the emitter electrode connected via a biasing resistor to a point of reference potential, a broadband amplifier having an input electrode capacitively coupled to said emitter electrode of said transistor via an equalization capacitor.

4. The receiver combination according to claim 1, wherein said FET is a gallium arsenide device connected as a source follower.

* * * * *